(12) United States Patent
Yin et al.

(10) Patent No.: US 12,174,779 B2
(45) Date of Patent: Dec. 24, 2024

(54) FPGA-BASED USB 3.0/3.1 CONTROL SYSTEM

(71) Applicant: CORIGINE (SHANGHAI), INC., Shanghai (CN)

(72) Inventors: Zhihao Yin, Zhejiang (CN); Sheng Lu, Zhejiang (CN); Kai Fan, Zhejiang (CN); Xiao Xiao, Zhejiang (CN); Kai Cheng, Zhejiang (CN)

(73) Assignee: Corigine (Shanghai), Inc., Shanghai (CN)

( * ) Notice: Subject to any disclaimer, the term of this patent is extended or adjusted under 35 U.S.C. 154(b) by 3 days.

(21) Appl. No.: 18/032,451

(22) PCT Filed: Jan. 29, 2021

(86) PCT No.: PCT/CN2021/074377
§ 371 (c)(1),
(2) Date: Apr. 18, 2023

(87) PCT Pub. No.: WO2022/088542
PCT Pub. Date: May 5, 2022

(65) Prior Publication Data
US 2023/0394006 A1    Dec. 7, 2023

(30) Foreign Application Priority Data
Nov. 2, 2020 (CN) .......................... 202011204498.5

(51) Int. Cl.
*G06F 13/42* (2006.01)
*G06F 15/78* (2006.01)

(52) U.S. Cl.
CPC ...... *G06F 13/4291* (2013.01); *G06F 15/7803* (2013.01); *G06F 2213/0042* (2013.01)

(58) Field of Classification Search
None
See application file for complete search history.

(56) References Cited

U.S. PATENT DOCUMENTS

| 10,713,209 | B2 * | 7/2020 | Jen | G06F 13/4221 |
| 11,474,969 | B1 * | 10/2022 | Jennings | G06F 13/4291 |
| 2018/0188321 | A1 * | 7/2018 | Pappu | G06F 11/273 |

FOREIGN PATENT DOCUMENTS

| CN | 102087624 A | 6/2011 |
| CN | 104881388 A | 9/2015 |

(Continued)

OTHER PUBLICATIONS

Wang, Z., A Design of Board Level High Speed Transmission Interface, Digital Technology and Application, Jan. 31, 2015, pp. 22-24, No. 01, ISSN: 1007-9416.

*Primary Examiner* — Farley Abad
*Assistant Examiner* — Dayton Lewis-Taylor
(74) *Attorney, Agent, or Firm* — Hudak, Shunk & Farine Co. LPA

(57) ABSTRACT

An FPGA-based USB3.0/3.1 control system, including: a USB control module including a USB3.0 control module and/or a USB3.1 control module; a PCS logic module connected to the USB control module via a PIPE interface; an FPGA Serdes serial communication module connected to the PCS logic module; and an external daughter card module connected to the FPGA Serdes serial communication module, wherein the PCS logic module, the FPGA Serdes serial communication module and the external daughter card module are connected in sequence to achieve a port physical layer function for testing the USB 3.0 control module and the USB 3.1 control module. The control system solves the cumbersome problems of incomplete emulation verification, test mode limitations, and unchangeable hardware functions in the prior art.

10 Claims, 4 Drawing Sheets

(56) References Cited

FOREIGN PATENT DOCUMENTS

| CN | 107656882 A | 2/2018 |
|----|-------------|--------|
| CN | 109656862 A | 4/2019 |

* cited by examiner

FPGA-BASED USB 3.0/3.1 CONTROL SYSTEM

FIELD OF THE INVENTION

The present application relates to a USB technology, and in particular, relates to an FPGA-based USB 3.0/3.1 control system.

BACKGROUND OF THE INVENTION

Currently, USB is one of the most commonly used wired communication protocols and is used in various fields such as cell phones, medical treatment, and storage. Current USB 3.0/3.1 rely primarily on chips, which is not good for USB testing and iterations. The success rate of USB chip tape out can only rely on pre-tape out emulation and pre-tape out testing with FPGA and PHY chips. First, the emulation verification is not complete; second, not many vendors can provide PHY chips, and therefore, the FPGA plus PHY test mode is very limited; third, although the cost of the chip is low, but the hardware functions cannot be changed, and accordingly, there are certain limitations.

SUMMARY OF THE INVENTION

In view of the above-mentioned shortcomings of the prior art, an objective of the present application is to provide an FPGA-based USB 3.0/3.1 control system to solve the problems of the prior art.

To achieve the above and other related objectives, a first aspect of the present application provides an FPGA-based USB 3.0/3.1 control system comprising: a USB control module including a USB 3.0 control module and/or a USB 3.1 control module; a PCS logic module connected to the USB control module via a PIPE interface; an FPGA Serdes serial communication module connected to the PCS logic module; an external daughter card module connected to the FPGA Serdes serial communication module, wherein the PCS logic module, the FPGA Serdes serial communication module and the external daughter card module are connected in sequence to achieve a port physical layer (phy) function for testing the USB 3.0 control module and the USB 3.1 control module.

In some embodiments of the first aspect of the present application, the PCS logic module, when applied to the USB 3.0 control module, comprises: a first data path logic applicable to USB 3.0 protocol having functions including 8B/10B codec, specific symbol indexing, data alignment and elastic buffer; a PIPE control logic for converting a Serdes interface of the FPGA Serdes serial communication module into a PIPE interface to communicate with the USB control module and control the FPGA Serdes serial communication module.

In some embodiments of the first aspect of the present application, the PIPE control logic has three clock sources including a differential to single-ended clock in the external daughter card module, a tx pcs clock, and an rx pma clock.

In some embodiments of the first aspect of the present application, when the PCS logic module is applied to the USB 3.1 control module, the FPGA Serdes serial communication module is connected to an Rx PII circuit and a Tx PII circuit; the PCS logic module comprises: a first data path logic applicable to USB 3.0 protocol having functions including 8B/10B codec, specific symbol indexing, data alignment, and elastic buffer; a second data path logic applicable to USB3.1 protocol having functions including 128B/132B codec, specific symbol indexing, data alignment, and elastic buffer; a PIPE control logic for converting serdes interface of the FPGA Serdes serial communication module into a PIPE interface to communicate with the USB control module and control the FPGA Serdes serial communication module; a DRP control logic for rate switching using dynamic configuration interfaces of the FPGA Serdes serial communication module, the Rx PII circuit and the Tx PII circuit to make USB 3.1 backward compatible with USB 3.0.

In some embodiments of the first aspect of the present application, the PIPE control logic has five clock sources including a differential to single-ended clock in the external daughter card module, a tx pcs clock, an rx pma clock, a tx pipe clock after tx pII frequency spitting, and an rx pipe clock after rx pII frequency spitting.

In some embodiments of the first aspect of the present application, the transfer rate of the FPGA Serdes serial communication module is configured differently depending on USB type; when applied to USB 3.0, the transfer rate of the FPGA Serdes serial communication module is configured to 5 Gbps; when applied to USB 3.1, the transfer rate of the FPGA Serdes serial communication module is configured to 10 Gbps.

In some embodiments of the first aspect of the present application, a serial port of the FPGA Serdes serial communication module transmits data in PCS mode and receives data in PMA mode.

In some embodiments of the first aspect of the present application, the FPGA Serdes serial communication module needs to enable txelecidlesend and rxelecidledetect related functions of the Serdes to facilitate receiving and sending electricalidle signals.

In some embodiments of the first aspect of the present application, the Serdes in the FPGA Serdes serial communication module needs to switch between LTR lock mode and LTD lock mode for link training of the USB.

In some embodiments of the first aspect of the present application, the external daughter card module includes a standard interface connector such as FMC, PCIE, etc. connected to a circuit board where the FPGA Serdes serial communication module is located, a USB2.0 PHY chip, a differential clock chip, a redriver or retimer chip, a controller chip, and a type-c interface.

As mentioned above, the FPGA-based USB3.0/3.1 control system of the present application has the following beneficial effects: the present invention provides a completely FPGA-based USB3.0/3.1 solution which uses a combination of USB controller soft core and FPGA serdes to get rid of the need for PHY chips during testing, and another advantage with FPGA product is that the hardware functions can be changed at any time, thereby effectively solving the cumbersome problems of incomplete emulation verification, test mode limitation, and unchangeable hardware functions in the prior art.

DETAILED DESCRIPTION OF THE INVENTION

Figure 1A:
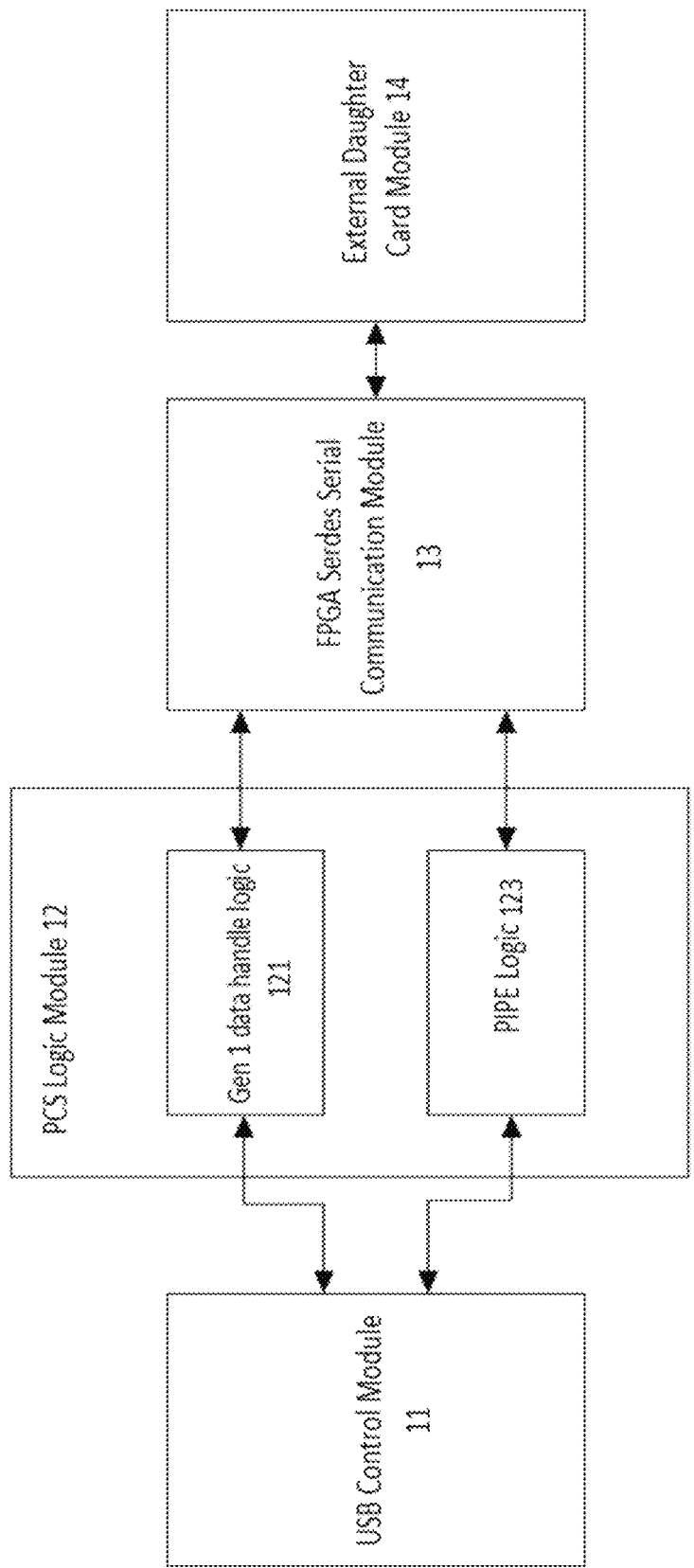
FIG. 1A shows a schematic diagram of the structure of the FPGA-based USB 3.0 control system in an embodiment of the present application.

The implementation of the present application will be described by particular embodiments. Other advantages and effects of this application will be readily understood by one of ordinary skill in the art by from the disclosure of this Specification. The present application may also be implemented or applied by other different embodiments, and the details of this Specification may be modified or improved in various ways based on different views and applications without departing from the spirit of the present application. It is noted that the following embodiments and the features therein can be combined if they are not conflict with each other.

It is noted that in the following description, reference is made to the accompanying drawings, which depict several embodiments of the present application. It should be understood that other embodiments may be used and that mechanical, structural, electrical, and operational changes may be made without departing from the spirit and scope of the present application. The following detailed description should not be considered limiting and the scope of the embodiments of the present application is defined merely by the disclosed claims. The terms used herein are intended to describe particular embodiments only and are not intended to limit the present application. Space-dependent terms such as "up," "down," "left," "right," "below", "under", "lower", "above", "upper" etc., may be used herein to describe the relationship of one element or feature and another element or feature shown in a figure.

In this application, unless otherwise expressly specified and defined, the terms "mount", "join", "connect", "fix", "secure" and the like should be understood in broad meaning. For example, it may be a fixed connection, or a removable connection, or an integral connection; it may be a mechanical connection, or an electrical connection; it may be a direct connection or an indirect connection through an intermediary; and it may be an internal connection of two elements. In this application, one of ordinary skill in the art will be able to understand the specific meaning of the above terms based on a particular circumstance.

Further, as used herein, the singular forms "a", "one" and "the" are intended to include the plural forms, unless the context indicates otherwise. It should be further understood that the terms "include", "comprise" indicate the presence of the described features, operations, elements, components, items, types, and/or groups, but do not exclude the presence, occurrence, or addition of one or more other features, operations, elements, components, items, types, and/or groups. The terms "or" and "and/or" as used herein are construed to be inclusive or to imply any one or any combination. Thus, "A, B or C" or "A, B and/or C" means any of the following: A; B; C; A and B; A and C; B and C; A, B and C". Exceptions to this definition occur merely when combinations of elements, functions, or operations are inherently mutually exclusive in some cases.

In order to make the objectives, technical solutions and advantages of the present invention more clear, the technical solutions of the embodiments of the present invention will be described in further detail with reference to the accompanying drawings. It should be understood that the specific embodiments described herein are intended to explain the invention only and not intended to limit the invention.

In response to the problem of low success rate of USB chip tape out in the prior art, the present invention provides a completely FPGA-based USB3.0/3.1 solution which uses a combination of USB controller soft core and FPGA serdes to get rid of the need for PHY chips during testing, and another advantage with FPGA product is that the hardware functions can be changed at any time, thereby effectively solving the cumbersome problems of incomplete emulation verification, test mode limitation, and unchangeable hardware functions in the prior art.

Figure 1B:
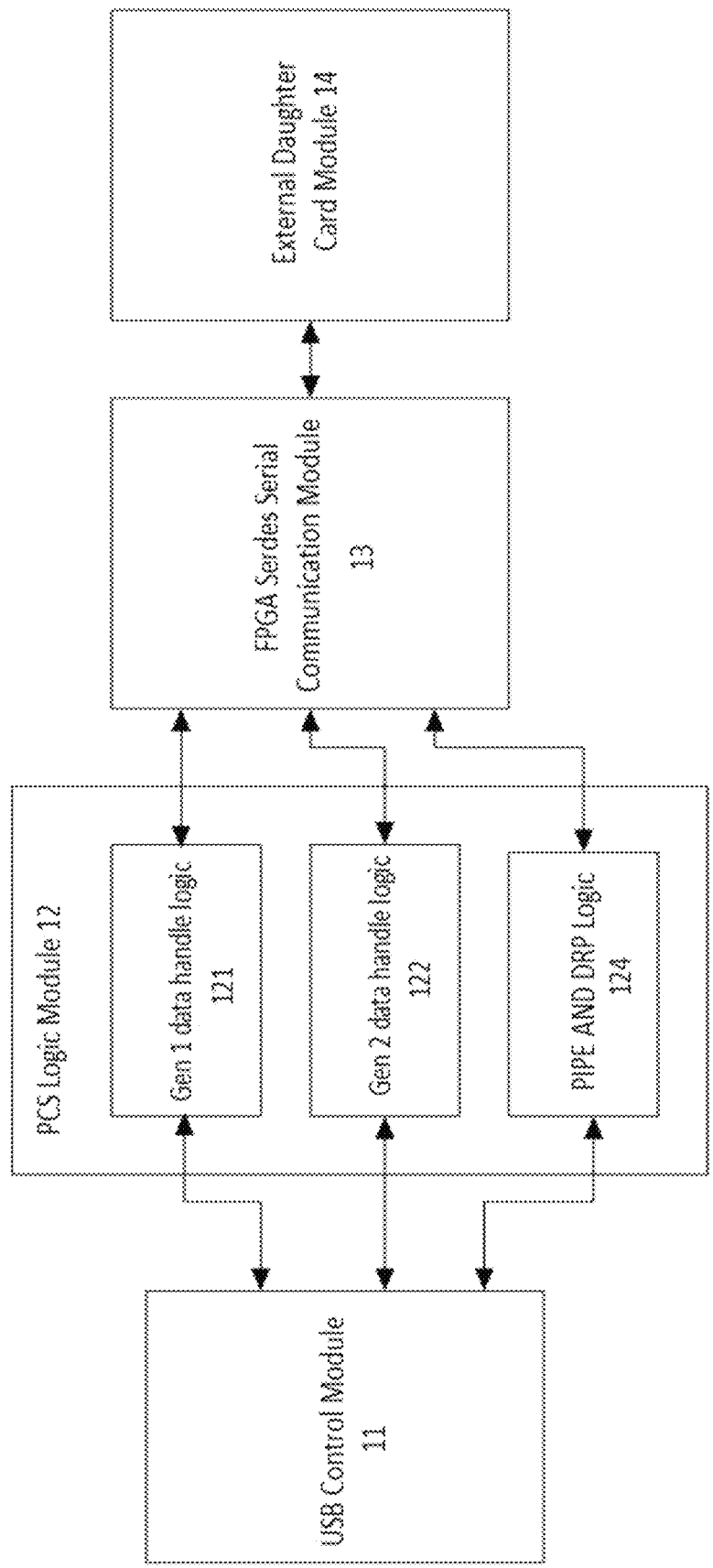
FIG. 1B shows a schematic diagram of the structure of the FPGA-based USB 3.1 control system in an embodiment of this application.

FIG. 1A shows a schematic diagram of the structure of the FPGA-based USB 3.0 control system in an embodiment of the present invention; FIG. 1B shows a schematic diagram of the structure of the FPGA-based USB 3.1 control system in an embodiment of the present invention. Specifically, the FPGA-based USB3.0/3.1 control system provided in this embodiment includes a USB control module 11, a PCS logic module 12, an FPGA Serdes serial communication module 13, and an external daughter card module 14.

The USB control module 11 can be a USB host or a USB device, and it is connected to the PCS logic module 12 via a PIPE interface. The PCS logic module 12 is connected to the FPGA Serdes serial communication module 13, which is connected to the external daughter rcard module 14. In this embodiment, the PCS logic module 12, the FPGA Serdes serial communication module 13, and the external daughter card module 14 are combined together to implement the functions of PHY, and can be used to test the behavior of the USB control module 11. As used herein, PHY is Port Physical Layer. PHY connects a data link layer device (MAC) to a physical medium, such as an optical fiber or a copper cable. An Ethernet PHY is a chip that can send and receive Ethernet data frames. Common Ethernet PHY devices include hubs or switches, etc. Each module in the USB 3.0/3.1 system will be further described below.

The full name of the PCS logic module 12 is Physical Coding Sublayer, which provides RMII interface, 4B/5B coding, serial-parallel conversion and conflict detection functions in 100BASE-X mode, and can provide an idle signal "idle" to the PMD layer when TxEN is invalid. In 10BASE-T mode, it only provides interface and serial-to-parallel conversion function.

In some examples, as shown in FIG. 1A, the PCS logic module 12, when applied to USB 3.0 (gen1, 5 Gbps), mainly includes a first data path logic (Gen1 data handle logic 121) and a PIPE control logic (PIPE logic 123). The first data path logic includes the following functions: 8B/10B codec, specific symbol indexing, data alignment, and elastic buffer. The PIPE control logic is mainly used to convert a Serdes interface to a PIPE interface, so as to communicate with the USB control module 11 and control the behavior of Serdes.

The 8B/10B codec is to decompose a set of consecutive 8-bit data into two sets of data, one set of 3 bits and the other set of 5 bits, which become a set of 4 bits and a set of 6 bits respectively after coding, thus forming a set of 10-bit data to be sent out. The data value can be expressed as DX.Y or KX.Y, where D denotes a data code, K denotes a special command code, X denotes the low 5 bits of the input original data, and Y denotes the high 3 bits of the input original data. Elastic buffer is used to achieve data synchronism between a local clock and a recovery clock in a high-speed, serial, source-synchronous data transmission protocol. By using the low watermark and high watermark of the elastic buffer, the increase or decrease of periodic redundant data (which needs to be supported by the transmission protocol) in the data stream can be determined, thereby balancing the data traffic between the two clock domains.

In some examples, as shown in FIG. 1B, when PCS logic module 12 is applied to USB 3.1 (gen2.10 Gbps), it includes a first data path logic (Gen1 data handle logic 121), a second data path logic (Gen2 data handle logic 122), a PIPE and DRP logic 124. Since USB 3.1 is to be backward compatible with the 3.0 mode, the data path is divided into two paths, one is the above-mentioned gen1 data path, and the other is gen2 data path that mainly includes the following functions: 128B/132B codec, specific symbol indexing, data alignment, and elastic buffer. It is worth noting that USB 3.0 uses 8B/10B codec, while USB3.0 uses new128B/132B codec. PIPE and DRP logic refer to PIPE control logic and DRP control logic. PIPE control logic is mainly used to convert Serdes interface into PIPE interface to communicate with the USB control module 11 and control Serdes behavior; DRP control logic mainly uses dynamic configuration interfaces of Serdes and pll for rate switching, including frequency switching of Serdes and frequency switching of pll, so as to realize the function of USB 3.1 backward compatible with USB 3.0.

In the FPGA Serdes serial communication module 13, Serdes is the abbreviation of SERializer/DESerializer, which is a mainstream time division multiplexing (TDM), point-to-point (P2P) serial communication technology. That is, multiple low-speed parallel signals at the transmitter side are converted into high-speed serial signals, transmitted through a transmission media (fiber optic cable or copper wire), and finally at the receiver side the high-speed serial signals are reconverted into low-speed parallel signals. This point-to-point serial communication technology makes full use of the channel capacity of the transmission media, reduces the number of required transmission channels and device pins, and increases the signal transmission speed, thereby significantly reducing communication cost.

In some examples, the transfer rate of the FPGA Serdes serial communication module 13 is configured differently depending on USB type. Specifically, the FPGA Serdes serial communication module 13 is configured to 5 Gbps when applied to USB 3.0 and 10 Gbps when applied to USB 3.1.

Optionally, the serial port of the FPGA Serdes serial communication module 13 transmits data in PCS mode and receives data in PMA mode. As used herein, the full name of PCS mode is Physical Coding Sublayer, which provides RMII interface, 4B/5B coding, serial-parallel conversion and conflict detection functions in 100BASE-X mode, and also provides idle signal "idle" to PMD layer whenever TxEN is invalid. PCS only provides interface and serial-parallel conversion functions in 10BASE-T mode. The full name of PMA is Physical Medium Attachment, which refers to a physical medium attachment sublayer that provides LINK state determination and carrier listening functions to complete the conversion between serial and NRZI signals. PMA uses a standard method to determine the LINK state of a port. When PMA determines a presence of the other device, it starts auto-negotiation with the other party to determine the operating mode of the port if auto-negotiation is enabled. When the other party does not support auto-negotiation, the operating mode of the port is based on the results of parallel probing.

Optionally, the FPGA Serdes serial communication module 13 needs to enable the txelecidlesend and rxelecidle detect related functions of the Serdes to facilitate receiving and sending electricalidle signals.

Optionally, the Serdes of the FPGA Serdes serial communication module 13 needs to switch between LTR lock mode and LTD lock mode of cdr to complete link training of the USB.

The external daughter card module 14 includes a standard interface connector such as FMC, PCIE, etc. for connection with the circuit board where the FPGA Serdes serial communication module 13 is located, a USB2.0PHY chip, a differential clock chip, a redriver or retimer chip, a cc controller chip, and a type-c interface. The cc controller refers to a configuration channel, which is a new key channel in the USB Type-C and its role includes USB connection detection, USB Type-C positive and negative data switching, and USB host and USB device handshake identification, etc.

In order to make one of ordinary skill in the art have a better understanding, the FPGA-based USB 3.0/3.1 control system of the present invention will be further explained and illustrated below with reference to FIG. 2A and FIG. 2B.

Figure 2A:
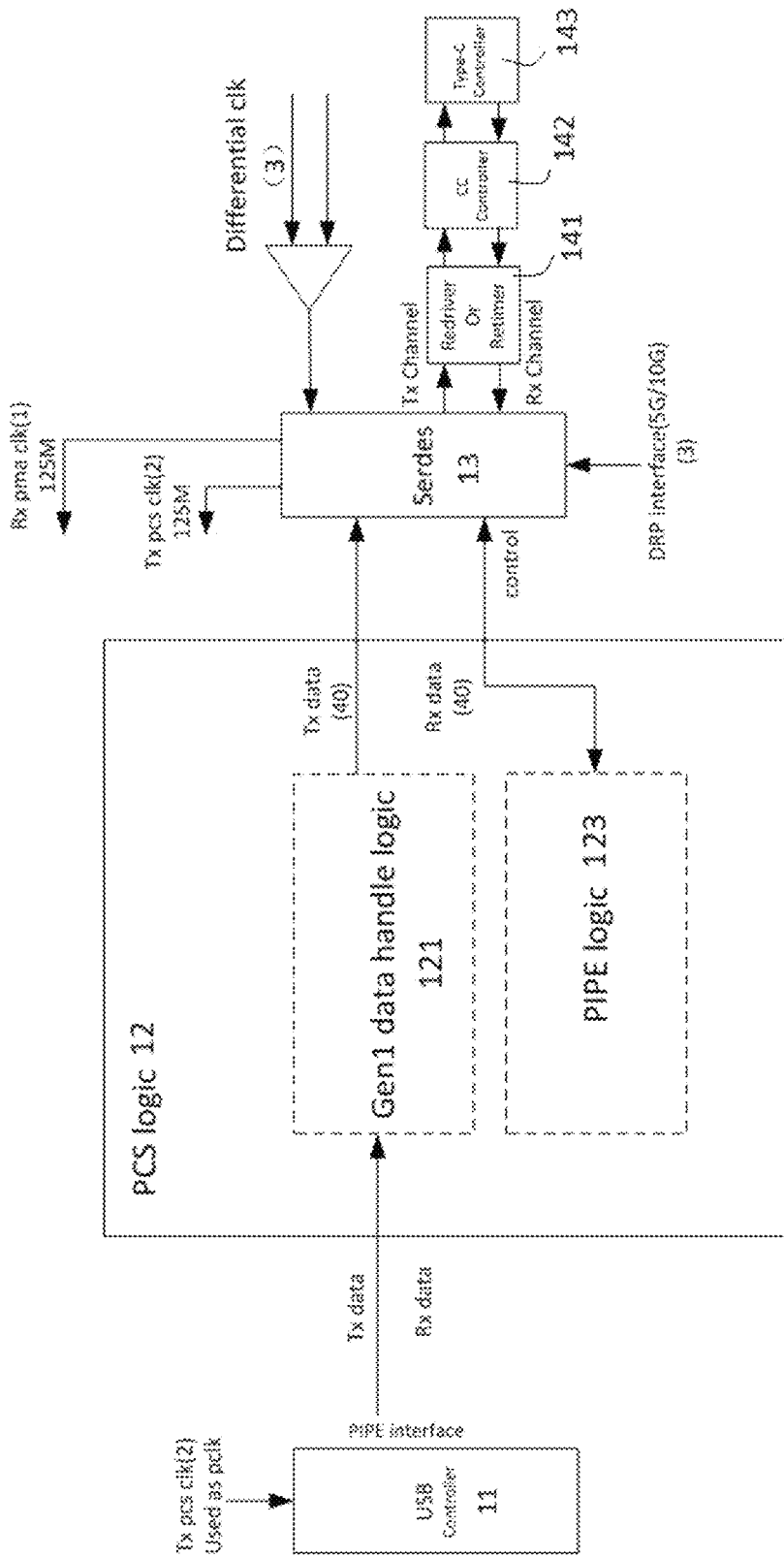
FIG. 2A shows a schematic diagram of the structure of the FPGA-based USB 3.0 control system in an embodiment of this application.

In FIG. 2A, a completely FPGA-based USB3.0 control system is provided for testing USB3.0 controller or debugging USB3.0 functions. The USB3.0 control system mainly includes the following aspects:

(1) The differential clk (3) of the external daughter card is converted to a single-ended clock to provide a clock source for the Serdes chip.

(2) The external daughter card is connected to the Serdes chip via a standard interface, wherein the standard interface is, for example, an FMC interface or a PCIE interface, etc.

(3) The redriver signal repeater or retimer 141 of the external daughter card processes the tx signal sent by the Serdes 13; the type-c controller 143 of the external daughter card receives the rx signal and then sends it to the cc controller 142, which sends the rx signal to the redriver signal repeater or the retimer. The cc controller refers to a configuration channel, which is a new key channel in the USB Type-C and its role includes USB connection detection, USB Type-C positive and negative data switching, and USB host and USB device handshake identification, etc.

(4) The Serdes chip data interface is configured to 40 bits; since USB3.0 operates at 5 Gbps, the txpcs clock (Tx pcs clk (2)) and the rx pma clock (Rx pma clk (1)) are generated at 125M.

(5) The Serdes chip uses CDR Lock-to-Reference mode during polling (LFPS handshake) to facilitate use of the rx pma clock to process PIPE logic signals, and uses CDR Lock-to-Data mode during link training, U0 and loopback, wherein rx pma clock is an accurate recovery clock.

(6) PIPE logic 123 is used to process the signals of Serdes chip interface, including mainly txelecidle, rxelecidle and cdrmode, and when combined with the signal of the PIPE interface of the USB controller, control of the Serdes chip can be achieved.

(7) The PIPE control logic has three clock sources: the differential to single-ended clock of the external daughter card (differential clk (3)), the tx pcs clock (Tx pcs clk (2)), and the rx pma clock (Rx pma clk (1)).

(8) The clock of the USB controller is tx pcs clock (Tx pcs clk (2)), and the USB controller is connected to PCS logic via a PIPE interface.

(9) In the Gen1data handle logic 121, 8b/10b encoding uses tx pcs clock (Tx pcs clk (2)); the 10b/8b decoding, specific symbol indexing, data alignment, and elastic buffer input use rx pma clock; the elastic buffer output uses tx pcs clock. Elastic buffer is used to achieve data synchronism between a local clock and a recovery clock in a high-speed, serial, source-synchronous data transmission protocol. By using the low watermark and high watermark of the elastic buffer, the increase or decrease of the periodic redundant data (which needs to be supported by the transmission protocol) in the data stream can be determined, thereby balancing the data traffic between the two clock domains.

(10) In the Gen1data handle logic, 8b/10b encoding is a common 8b/10b encoder and 10b/8b decoding is a common 10b/8b decoder; the specific symbol indexing mainly indexes the symbol COM; the data alignment is used to do 1 byte alignment of data; elastic buffer is used to detect and add/delete Gen1SKP symbol for eliminating frequency bias.

Figure 2B:
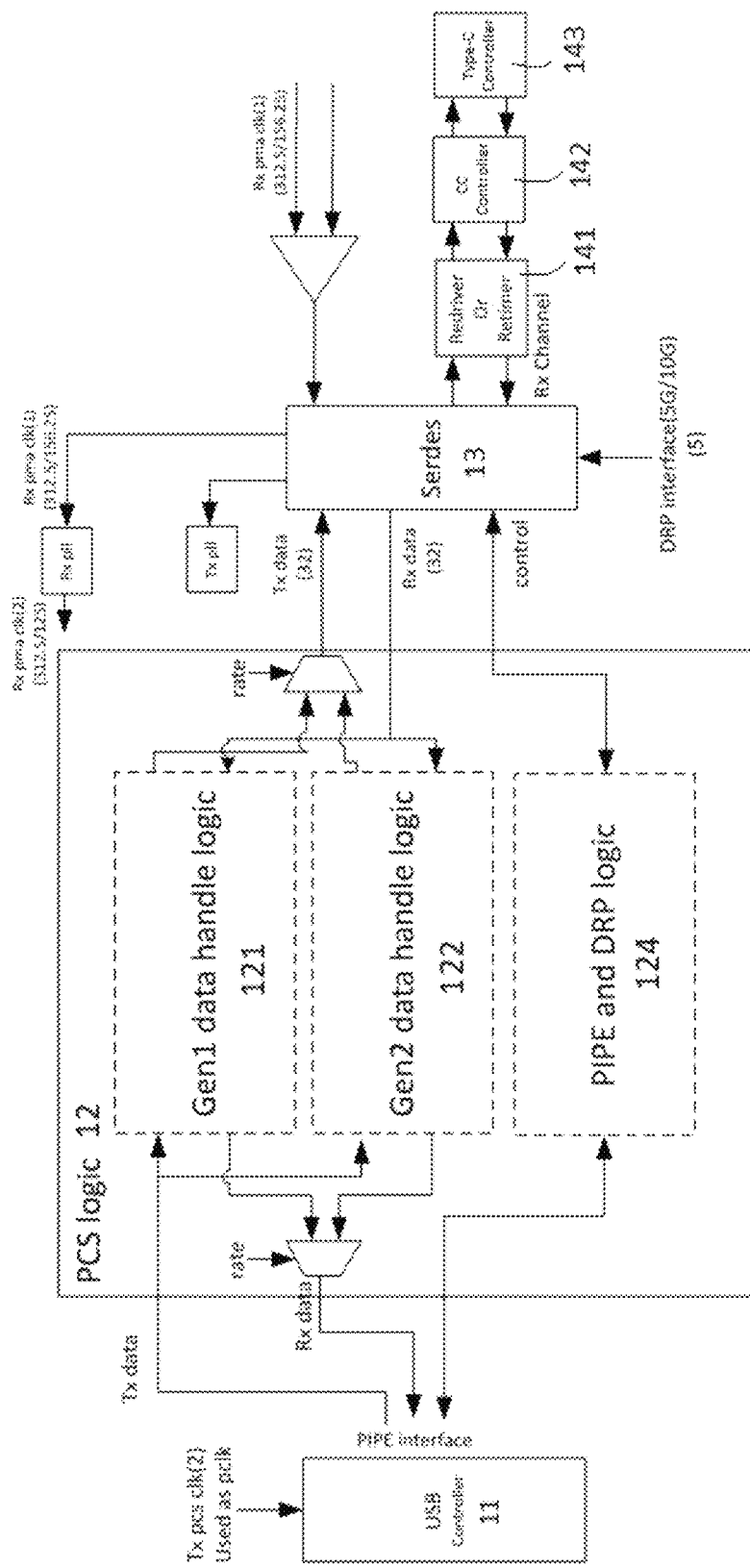
FIG. 2B shows a schematic diagram of the structure of the FPGA-based USB 3.1 control system in an embodiment of this application.

In FIG. 2B, a completely FPGA-based USB 3.1 control system is provided for testing USB 3.1controller or debugging USB 3.1 functions. The USB 3.1 control system mainly includes the following aspects.

(1) The differential clk (3) of the external daughter card is converted to a single-ended clock to provide a clock source for the Serdes chip 13.

(2) The external daughter card is connected to the Serdes chip via a standard interface, wherein the standard interface is, for example, an FMC interface or a PCIE interface, etc.

(3) The redriver signal repeater or retimer 141 of the external daughter card processes the tx signal sent by the Serdes; the type-c controller 143 of the external daughter card receives the rx signal and then sends it to the cc controller 142, which sends the rx signal to the redriver signal repeater or the retimer. The cc controller refers to a configuration channel, which is a new key channel in the USB Type-C and its role includes USB connection detection, USB Type-C positive and negative data switching, and USB host and USB device handshake identification, etc.

(4) The Serdes chip data interface is configured to 32 bits. The Serdes chip generates tx pcs clock (Tx pcs clk (3)) and rx pma clock (Rx pmaclk (1)) both at 312.5M when operating at 10 Gbps, and generates tx pcs clock (Tx pcs clk (3)) and rx pma clock (Rx pma clk (1)) both at 156.25M when operating at 5 Gbps.

(5) rxpll is used for frequency splitting of the rx pma clock (Rx pma clk (1)) and txpll is used for frequency splitting of the tx pcs clock (Tx pcs clk (3)). In the 10 Gbps mode, the output-input ratio is 1:1 (input 312.5M, output 312.5M); in the 5 Gbps mode, the input-output ratio is 5:4 (input 156.25M, output 125M).

(6) The Serdes chip uses CDR Lock-to-Reference mode during polling (LFPS handshake) to facilitate the use of rx pma clock to process PIPE logic signals, and uses CDR Lock-to-Data mode during link training, U0 and loopback, wherein rx pma clock is an accurate recovery clock.

(7) PIPE logic 124 is used to process the signals of Serdes chip interface, including mainly txelecidle, rxelecidle and cdrmode, and when combined with the signal of the PIPE interface of the USB controller, control of the Serdes chip can be achieved.

(8) The PIPE control logic has five clock sources: the differential to single-ended clock of the external daughter card, the tx pcs clock, the rx pma clock, the txpipe clock after txpll frequency splitting, and the rxpipe clock after rxpll frequency splitting.

(9) The clock of the USB controller 11 is txpipe clock and the controller is connected to PCS logic 12 through a PIPE interface.

(10) In Gen1data handle logic 121, 8b/10b encoding uses tx pcs clock and txpipe clock; 10b/8b decoding, specific symbol indexing, data alignment, and the elastic buffer input use rx pma clock and rxpipe clock; the elastic buffer output uses txpipe clock.

(11) In Gen1data handle logic, 8b/10b encoding is a common 8b/10b encoder and 10b/8b decoding is a common 10b/8b decoder. The specific symbol indexing mainly indexes the symbol COM; the data alignment is used to do 1 byte alignment of data; elastic buffer r is used to detect and add/delete Gen1SKP symbol for eliminating frequency bias. Elastic buffer is used to achieve data synchronism between a local clock and a recovery clock in a high-speed, serial, source-synchronous data transmission protocol. By using the low watermark and high watermark of the elastic buffer, the increase or decrease of the periodic redundant data (which needs to be supported by the transmission protocol) in the data stream can be determined, thereby balancing the data traffic between the two clock domains.

(12) In Gen2data handle logic 122, 128/132 encoding uses tx pcs clock and txpipe clock; 132/128 decoding, specific symbol indexing, data alignment and elastic buffer input use rx pma clock and rxpipe clock; elastic buffer output uses txpipe clock.

(13) In Gen2data handle logic, 128/132 codec uses a standard codec. The specific symbol indexing mainly indexes syncheader. The data alignment is used to do 1 byte alignment of data; elastic buffer is used to detect and add/delete Gen2SKP symbol for eliminating frequency bias.

(14) Data path switching is done by the rate or pclk_rate signal of the PIPE interface.

(15) Since USB 3.1 needs to be backward compatible with USB3.0, it is configured using the dynamic configuration ports of Serdes and pll, controlled by DRP logic 124, and rate switching is performed under the instruction of USB controller's rate or pclk_rate signal.

In summary, the present application provides an FPGA-based USB3.0/3.1 control system, wherein a completely FPGA-based USB3.0/3.1 solution is provided which uses a combination of USB controller soft core and FPGA serdes to get rid of the need for PHY chips during testing, and another advantage with FPGA product is that the hardware functions can be changed at any time, thereby effectively solving the cumbersome problems of incomplete emulation verification, test mode limitation, and unchangeable hardware functions in the prior art. Therefore, the present application effectively overcomes the shortcomings of the prior art and has a high industrial value.

The above embodiments are merely illustrative of the principles and effects of the present application, and are not intended to limit the present application. One of ordinary skill in the art may modify or change the above embodiments without departing from the spirit and scope thereof. Therefore, all equivalent modifications or changes made by one of ordinary skill in the art without departing from the spirit and technical ideas disclosed herein shall still be covered by the claims of this application.

What is claimed is:

1. A Field Programmable Gate Array (FPGA)-based Universal Serial Bus (USB) 3.0/3.1 control system, comprising:

a USB control module including a USB 3.0 control module and/or a USB 3.1 control module;

a Physical Coding Sublayer (PCS) logic module connected to the USB control module via a PHY Interface for PCI Express (PIPE) interface;

an FPGA Serdes serial communication module connected to the PCS logic module;

an external daughter card module connected to the FPGA Serdes serial communication module, wherein, the PCS logic module, the FPGA Serdes serial communication module and the external daughter card module are connected in sequence to achieve a port physical layer (PHY) function for testing the USB 3.0 control module and/or the USB 3.1 control module.

2. The FPGA-based USB 3.0/3.1 control system according to claim 1, wherein the PCS logic module, when applied to the USB 3.0 control module, comprises:

a first data path logic applicable to USB 3.0 protocol having functions including 8B/10B codec, specific symbol indexing, data alignment and elastic buffer;

a PIPE control logic for converting a Serdes interface of the FPGA Serdes serial communication module into the PIPE interface to communicate with the USB control module and control the FPGA Serdes serial communication module.

3. The FPGA-based USB 3.0/3.1 control system according to claim 2, wherein the PIPE control logic has three clock sources including a differential to single-ended clock in the external daughter card module, a Tx PCS clock, and an Rx Physical Medium Attachment (PMA) clock.

4. The FPGA-based USB 3.0/3.1 control system according to claim 1, wherein when the PCS logic module is applied to the USB 3.1 control module, the FPGA Serdes serial communication module is connected to an Rx PII circuit and a Tx PII circuit; the PCS logic module comprises:

a first data path logic applicable to USB 3.0 protocol having functions including 8B/10B codec, specific symbol indexing, data alignment, and elastic buffer;

a second data path logic applicable to USB 3.1 protocol having functions including 128B/132B codec, specific symbol indexing, data alignment, and elastic buffer;

a PIPE control logic for converting a Serdes interface of the FPGA Serdes serial communication module into the PIPE interface to communicate with the USB control module and control the FPGA Serdes serial communication module;

a Dynamic Reconfiguration Port (DRP) control logic for rate switching using dynamic configuration interfaces of the FPGA Serdes serial communication module, the Rx PII circuit and the Tx PII circuit to make USB 3.1 backward compatible with USB 3.0.

5. The FPGA-based USB 3.0/3.1 control system according to claim 4, wherein the PIPE control logic has five clock sources including a differential to single-ended clock in the external daughter card module, a Tx PCX clock, an Rx Physical Medium Attachment (PMA) clock, a Tx PIPE clock after Tx PII frequency spitting, and an Rx PIPE clock after Rx PII frequency spitting.

6. The FPGA-based USB 3.0/3.1 control system according to claim 1, wherein the transfer rate of the FPGA Serdes serial communication module is configured differently depending on USB type; when applied to USB 3.0, the transfer rate of the FPGA Serdes serial communication module is configured to 5 Gbps; when applied to USB 3.1, the transfer rate of the FPGA Serdes serial communication module is configured to 10 Gbps.

7. The FPGA-based USB 3.0/3.1 control system according to claim 1, wherein a serial port of the FPGA Serdes serial communication module transmits data in a PCS mode and receives data in a Physical Medium Attachment (PMA) mode.

8. The FPGA-based USB 3.0/3.1 control system according to claim 1, wherein the FPGA Serdes serial communication module needs to enable txelecidlesend and rxelecidledetect related functions of the Serdes to facilitate receiving and sending electricalidle signals.

9. The FPGA-based USB 3.0/3.1 control system according to claim 1, wherein the Serdes in the FPGA Serdes serial communication module needs to switch between a Lock-to-Reference (LTR) lock mode and a Lock-to-Data (LTD) lock mode for link training of the USB.

10. The FPGA-based USB 3.0/3.1 control system according to claim 1, wherein the external daughter card module includes a standard interface connector that is an FGPA Mezzanine Card (FMC) interface connector or a Peripheral Component Interconnect Express (PCIE) interface connector connected to a board where the FPGA Serdes serial communication module is located, a USB 2.0 PHY chip, a differential clock chip, a redriver or retimer chip, a Configuration Channel (CC) controller chip, and a USB Type-c interface.

* * * * *